Figure 1:
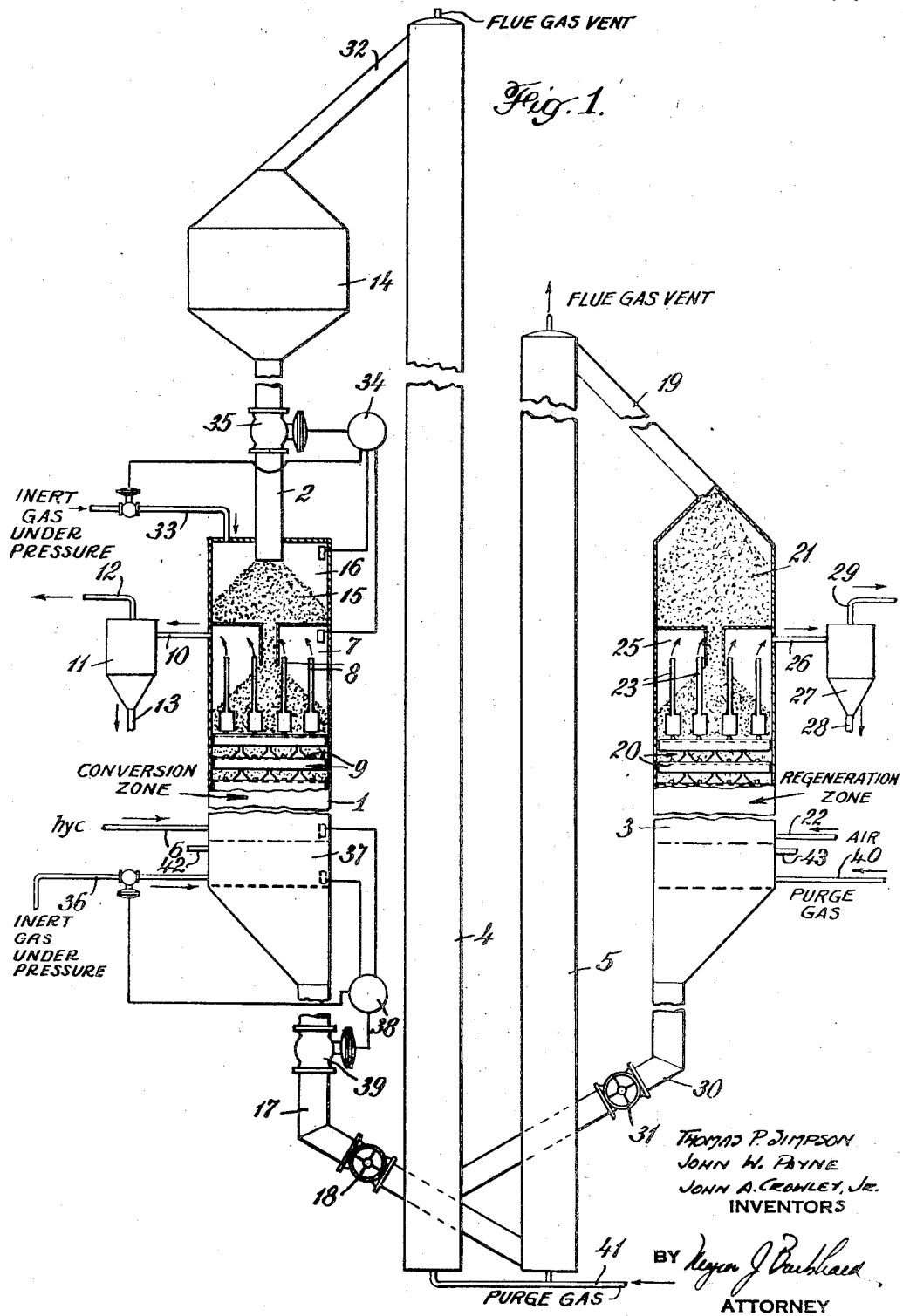

Patented Oct. 29, 1946

2,410,309

UNITED STATES PATENT OFFICE 2,410,309

CONTINUOUS CATALYTIC SYSTEM

Thomas P. Simpson, John W. Payne, and John A. Crowley, Jr., Woodbury, N. J., assignors to Socony-Vacuum Oil Company, Incorporated, a corporation of New York Application May 1, 1942, Serial No. 441,316

18 Claims. (Cl. 196—52)

This invention is concerned primarily with a continuous catalytic system for cracking heavier petroleum fractions, e. g., gas oil, to gasoline in the presence of solid catalyst particles requiring periodic regeneration. However, the invention also relates more broadly to any hydrocarbon conversion reaction in the presence of such catalysts, as, for example, polymerization of hydrocarbon gases, reforming naphtha, treating gasoline, etc., as well as systems in general wherein a solid particle contact material is introduced to an enclosed zone operating under pressure for contact with a gaseous material therein.

Catalytic cracking is now a well established part of the petroleum industry and the operating conditions and the catalysts therefor are rather well known, including the regeneration of the spent catalysts. Thus, the Simpson et al. Patents 2,185,930 and 2,185,931 disclose such operations. Temperatures of around 750° to 975° F. and pressures between about atmospheric and 30 pounds per square inch are considered most desirable for cracking although it is realized there may be variations. Similarly, alumina-silica catalysts, either natural or synthetic, are preferred; however, other catalysts have been proposed and may be used. Likewise, it now is realized the regeneration temperature for burning off carbonaceous matter with air should be controlled between about 850° and about 1200° F. In the same manner, operating conditions and the catalysts for other hydrocarbon conversion processes are rather well known, as, for instance, in reforming naphtha, it is understood that the same catalysts may be used as are used for cracking but under somewhat different temperature conditions.

In the copending Simpson et al. application Serial No. 361,440, filed October 16, 1940, which, in turn, is a continuation-in-part of Serial No. 162,541, filed September 4, 1937, there is disclosed specifically a continuous system for carrying out catalytic cracking wherein a conversion zone remains continuously on conversion by having the solid catalyst particles move therethrough and a regeneration zone remains continuously on regeneration by having the spent catalyst particles move therethrough. In such a system, means must be devised for introducing and withdrawing the solid catalyst particles to and from the conversion zone without substantial flow of undesired gases to and from this zone. The present invention is directed particularly to an improvement in this feature and to a unitary system of improved design which has several operating advantages.

Therefore, it is an object of the present invention to provide a novel and efficient means for flowing solid catalyst particles through a continuous hydrocarbon conversion system.

A more specific object is to provide a system for introducing and withdrawing solid catalyst particles to and from a vapor-sealed hydrocarbon conversion zone (or a catalyst regeneration zone) which system does not require vapor-sealed catalyst valves, and, therefore, which has less tendency to crush the catalyst or to have mechanical failure or to cause variations in the pressure within the zone.

Another object is to provide a continuous catalytic hydrocarbon conversion system which permits the maintaining of proper pressure balances throughout the system in a very practical manner.

Still another object is to provide a system having the above advantages which is applicable to operations in general wherein solid contact particles are introduced to a zone operating under pressure for contact with a gaseous material therein.

These and other objects will be apparent from the following description of the invention. In describing our invention, for the sake of simplicity, we shall speak primarily of catalytic cracking and of doing same in the presence of a clay catalyst. It is to be understood, however, that the invention has a wider scope, as indicated above.

According to the preferred embodiment of our invention, clay catalyst is flowed into the top part of a continuous cracking case through an elongated clay leg which extends above the case and which has a sufficient height that the pressure of the clay head in such clay leg is greater than the pressure in the case. The clay leg empties into an accumulation of clay at the point it enters the case so that the clay feed is even and the accumulation remains substantially constant. Preferably, clay fills the case, or substantially fills the case (allowing for the natural void spaces of the clay and the displacing effect of internal case structure, if any), and hence, a substantially compact column of catalyst is maintained in the case. This column of catalyst may then form the accumulation of clay into which the clay leg feeds, or it may be in continuous clay contact with such an accumulation so that this column of clay and the clay leg comprise a continuous body of clay. Clay from the clay leg then flows into the substantially compact column of catalyst in the conversion zone of the case at the same rate at which spent catalyst is withdrawn from near the bottom of the column, thereby maintaining a column of active catalyst within the case. Spent clay is preferably withdrawn from the bottom of the case by means of a compact leg of clay which also presents sufficient resistance to the flow of gases to restrict the flow of gases therethrough to a comparatively small quantity. In the unitary system, the regeneration case may be operated in an analogous manner; however, since this zone may be under atmospheric pressure and since neither substantial recovery of flue gas nor substantial exclusion of air from the zone is essential, a simpler means may be employed.

In order to have the hydrocarbon vapor flow through the substantially compact column of clay catalyst particles in the conversion case at a feasible rate but not flow through the clay leg seals when the two form one continuous body of clay, there preferably should be baffling structure or the like in the case to assist the flow of the gases therein. This baffling or gas-flow-assisting structure may take various forms and be more or less extensive, depending upon the size and shape of the particles.

Thus, in the copending Simpson et al. application Serial No. 362,882, filed October 25, 1940, now Patent 2,331,433, it is disclosed that where the catalyst particles in a continuous system are rather small, e. g., around 10 to 100 mesh, whereby breakage and crushing losses are lessened, baffling of compact columns of such catalyst should be used so as to provide substantially continuous gas paths through the column. Otherwise it is extremely difficult to flow the gas through the catalyst column at feasible rates and to prevent "boiling" of the clay. Baffling of this sort is desirable for any size catalyst but where catalysts having larger void spaces are used, there is less resistance to the passage of vapors, and, accordingly, baffling is less advantageous.

For instance, as the particle size approaches, say, 5 or 6 mesh and larger, and the particles are made sufficiently hard to properly withstand abrasion, very little, if any, baffling would be actually needed merely for getting gas through the catalyst column at a practical rate, even though it may be desirable to use same. Therefore, under such circumstances, baffling in the conversion case may be eliminated. This may be done even where the catalyst in the clay column and in the clay leg form one continuous body by having the clay leg of substantially narrower cross-section than the column of catalyst in the case so that it offers substantially more resistance to flow of gas therethrough, and this is particularly true where a blanket of inert gas is maintained around the lower end of the clay leg as will be described later herein.

In the present invention, therefore, the rule to be followed is that the column of catalyst in the conversion zone—if a column is used therein—should permit passage of gas therethrough at a feasible rate either because of particle size or assisting structure, while the clay leg should be of such form and/or of such compactness as to offer substantially more resistance to gas flow so that gas will not pass out the leg but can be drawn off independently from the top of the conversion zone. We feel it is most desirable to employ baffling, and we prefer to use baffling structure in the conversion zone of the type covered in the above-mentioned application Serial No. 362,882, now Patent 2,331,433.

As stated above, the clay feed leg should be of sufficient height that the clay head in the leg is greater than the pressure in the case at the point of clay inlet. Thus we have found, for instance, that for clay or catalyst of 10–48 mesh and about 0.66 apparent specific gravity (41 lbs. per cu. ft.), it is possible to flow clay freely through a six inch pipe size leg at rates of at least 160 pounds per minute into a flue gas sealed system by establishing a clay head of 5 to 6 feet for each pound per square inch of pressure prevailing in the hopper into which the clay leg feeds. Therefore, assume, for example, that the apparatus—other than the reactor—is nominally operating at atmospheric pressure, and that the actual pressure being maintained in the exit vapor zone of the reactor is about 3 pounds per square inch gauge. Then it is possible to establish proper clay flow into the apparatus by providing a clay leg of 15 to 18 feet or more, between the main supply hopper at the top of the leg and the reactor hopper at the top of the reactor and into which the clay leg feeds. It, of course, will be apparent that where a catalyst is employed of different size and density than the 10–48 mesh clay mentioned above, that there will be an obvious variation in the minimum required number of feet of clay leg per square inch of pressure in the case. Moreover, the rate of clay flow can be increased both by increasing the head of clay and by enlarging the pipe through which it flows. The rates of clay flow that can be maintained into a given system are dependent on the clay size and density, the cross-section of the leg, the length of the leg and the nature of the vapors in the seal system.

Figure 2:
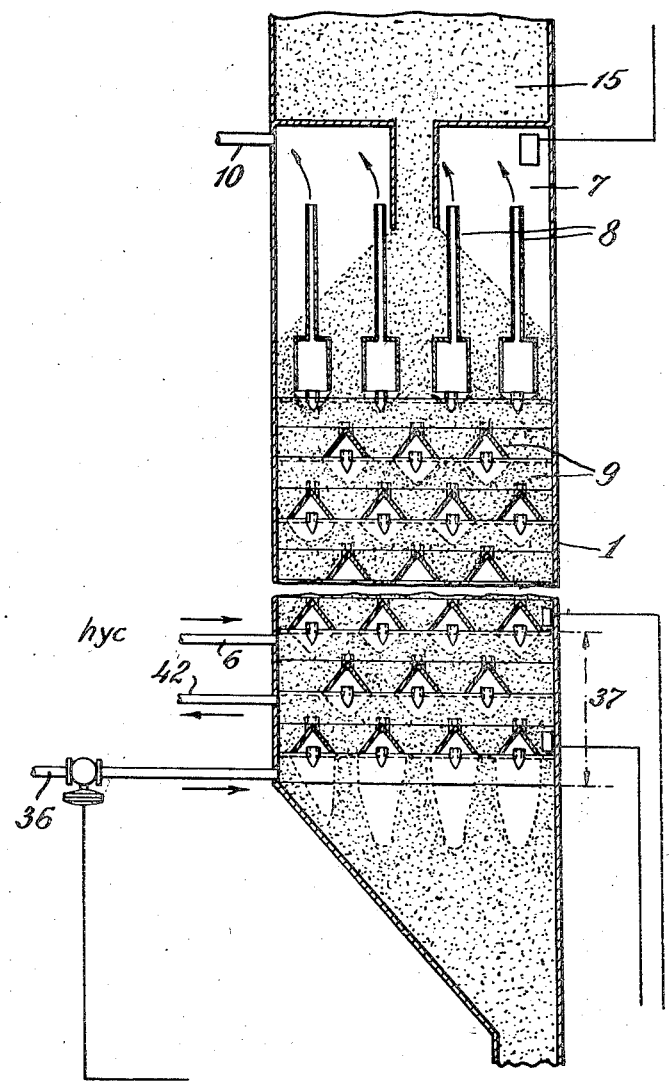

The invention will be described further by reference to the accompanying drawings Figure 1 of which shows a preferred embodiment of our system, while Figure 2 shows detail thereof, both in diagram form.

The system shown in the drawings comprises a conversion case 1, with a clay feed leg 2 therefor, a regeneration case 3, and catalyst elevators 4 and 5 for returning catalyst to the conversion case 1 and the regeneration case 2, respectively.

In operation, hydrocarbon charge stock which has been vaporized and heated to reaction temperature in a suitable furnace (not shown) is introduced to case 1, by line 6. These vapors pass upwardly through the case under cracking conditions in contact with a baffled column of catalyst moving downwardly therethrough, thereby effecting the desired cracking. Cracked products are withdrawn from the top of the baffles 9 into space 7 through vents 8. These withdrawn vapors then pass through line 10 to cyclone separator 11 for separation of entrained catalyst particles. Vapors leaving separator 11 at 12 are passed to a suitable distillation system (not shown), while removed catalyst particles leaving separator 11 by line 13 may be discarded or returned to the system, as desired. In the distillation system the cracked products are separated in conventional manner into a cracked gasoline and a cycle stock fraction. The cycle stock fraction may be recycled, if desired, to the conversion zone for further cracking.

Fresh or regenerated catalyst contained in main hopper 14 feeds in a compact column through clay leg 2 into the accumulation of clay 15 in reactor hopper 16. The leg 2 is of sufficient height to permit free clay flow at the desired rates against the pressure in hopper 16, without the use of any clay valve, and the flow of gas through the clay leg countercurrent to the clay will be negligible, due to the enormous frictional resistance of the fine, closely-packed clay particles. An atmosphere of steam or inert gas maintained in the reactor hopper prevents the passage of any hydrocarbon vapors up through the clay leg.

Spent clay at the bottom of reactor 1 passes in the form of a compact column of clay through clay leg 17 to the bottom elevator 5. Since clay leg 17 also presents more resistance to gas flow than the baffled column of catalyst in case 1, there is a negligible loss of gases therethrough. A valve or orifice 18 may be placed in leg 17 in order to regulate the rate of flow of catalyst.

Catalyst elevator 5, as well as elevator 4, may be of any suitable type, such as a bucket-type conveyer or a skip-hoist. Spent catalyst at the bottom of conveyer 5 is lifted by this conveyer to the top thereof from where it passes through clay line 19 to the regeneration case hopper 21 in the top of regeneration case 3. Spent catalyst passes from hopper 21 on down through case 3 under regeneration conditions so as to be properly regenerated by the time it reaches the bottom of the case. The regeneration is effected by air introduced by line 22 near the bottom of the case and which rises therethrough. Flue gases resulting from the regeneration process are withdrawn from the top of baffles 20 through vents 23 into space 25 from where they pass through line 26 into cyclone separator 27 for separation of any entrained catalyst. Catalyst particles leaving separator 27 through line 28 may be returned to the system or discarded. Flue gas in line 29 may be vented or used for purging in the system as later described. Any flue gas which may pass upwardly through clay line 19 is vented from the top of elevator 5.

Regenerated clay leaving the bottom of case 3 passes through clay line 30, which may contain clay flow-rate valve 31, into the bottom of elevator 4. Gases in the case 3 are prevented from passing downwardly into elevator 4, preferably by constructing clay line 30 similarly to clay leg 17 of case 1. The regenerated clay pouring into the bottom of elevator 4 is raised by this elevator into clay line 32 at the top of the elevator and passes through this line back into main hopper 14 for reuse in the system. Any flue gas carried by the catalyst into elevator 4 may be vented at the top thereof. Fresh make-up catalyst may be added to the system as needed, and fines withdrawn from the system, as required, in suitable manner.

Accordingly, it will be seen that catalyst flows through the complete cycle of the system without the necessity of vapor-sealed catalyst valves and yet in such fashion that proper vapor seals are maintained. Moreover, a more constant pressure may be maintained in the conversion case by the present system than where catalyst is being fed into the case and removed from the case through vapor-sealed valves.

Another important feature of the invention resides in the use of blankets of inert gas at the top and bottom of the conversion case as further insurance against leakage of hydrocarbon vapors through the leg of catalyst entering or leaving the case. This inert gas may be the flue gas withdrawn from regeneration case 3 and leaving separator 27 at 29. However, any other inert gas may be used, such as, for example, steam. This gas is passed through line 33 into reactor hopper 16 so as to create a slightly higher pressure therein than exists in the upper hydrocarbon vapor space 7 of case 1, whereby it will be impossible for hydrocarbon vapors to enter hopper 16. On the other hand, only a small amount of the inert gas will go into the vapor space 7 of case 1, and out with the cracked products since the pressure differential is very small and there is a considerable resistance offered to such gas flow by the clay. A differential pressure controller 34 also is provided so that it will automatically close valve 35 in clay leg 2 if the positive differential pressure in the reactor hopper 16 falls below a fixed minimum.

Similarly, inert gas may be fed through line 36 into purge section 37 at the bottom of case 1, so as to maintain a slightly higher pressure therein than exists in the case at the hydrocarbon vapor inlet 6. Differential pressure controller 38 is devised to automatically shut valve 39 in clay leg 17 if this positive pressure differential falls below a certain minimum. Thus, it is to be noted that the inert gas at the bottom of case 1, not only serves to blanket the hydrocarbon vapors from the clay withdrawal leg but also serves to effect purging of the spent catalyst of hydrocarbon material before it passes to the regeneration case 3. Purging of the regenerated catalyst of regeneration gases in case 3, if desired, before returning such catalyst to case 1, may be effected in a similar manner by introducing purge gas through line 40. In both of these purging operations, as shown, substantially all of the purge gases will pass upwardly through the cases and out with the gaseous products. If desired, the purge gases can be collected separately by inserting suitable collecting headers below points 6 or 22, such as those shown in Figure 2, attached to exit pipes 42 and 43.

As another added precaution, inert purge gas, such as, for example, flue gas from cyclone separator 27, is passed through line 41 into the bottom of elevators 4 and 5, the gas being vented at the top of the elevators. This feature provides a safety seal between all parts of the clay transfer system. Therefore, it will be seen that purging may be effected in the bottom part of both cases and in both elevators. On the other hand, it may be eliminated at all these points if found unnecessary, or it may be practiced only at such points as are necessary or desirable. For example, purging might be conducted only in the elevators. Further, purging of hydrocarbon material from the spent catalyst passing from the conversion case to the regeneration case is required more than purging of the regenerated catalyst. Accordingly, purging of spent catalyst only may be practiced. Also, in this connection, it has been found that when steam is used for the seal gas in chamber 16, disturbances may occur in the operation of the clay leg. In certain cases the disturbance may be severe enough to actually interrupt the flow of clay through leg 2 into hopper 16. This effect is apparently due to the adsorption of steam by the clay in clay leg 2. If the clay is thoroughly saturated with steam prior to entering clay leg 2 the disturbance through the use of steam in hopper 16 does not occur. The clay may be saturated with steam prior to entering clay leg 2 by introducing steam into hopper 14, elevator 4 or purge section 40.

Figure 2 shows the detailed internal arrangement at the bottom of the reactor, which is the same in reactor and regenerator.

It is to be understood that in the present unitary system, the catalyst should be passed substantially directly from each case to the other case so that the catalyst is still in a heated condition when it reaches the case to which it is being sent. In this way, a substantial economy in operation is realized.

As noted hereinabove, conditions and catalysts for catalytic cracking and other hydrocarbon reactions are known. Moreover, conditions for regenerating the catalysts are known. Such operations are shown, for instance, in the various Simpson et al. patents and applications mentioned hereinabove. Furthermore, it is to be understood any continuous catalyst regeneration process may be used in the present unitary system. However, it is preferred to use a process of the type disclosed in the Simpson et al. application Serial No. 362,882, now Patent 2,331,433.

We claim:

1. In a process of continuously catalytically cracking heavier petroleum hydrocarbons in the presence of particle-form solid catalyst material wherein the catalyst is moved downwardly through a conversion zone operating under pressure as a substantially compact column of particles and vapors of said heavier hydrocarbons are passed under cracking conditions through said column of catalyst and wherein active catalyst particles are introduced to said zone near the top thereof and spent particles are withdrawn near the bottom thereof so as to maintain a column of active catalyst while preventing the escape of a substantial amount of gaseous hydrocarbons through the catalyst-introducing and catalyst-withdrawing systems, the improvement which comprises establishing a compact upwardly extending stream of catalyst particles above said column of catalyst which forms a continuous body of catalyst with said column and which is long enough to have a substantially greater resistance to the flow of gas therethrough than through said column of catalyst and maintaining said stream of catalyst at sufficient height that the head of catalyst created thereby is greater than the pressure in said conversion zone so that catalyst feeds by gravity from the catalyst stream to said column of catalyst without passing through any vapor-sealing catalyst valve, and withdrawing spent catalyst from said column of catalyst in the form of a downwardly extending compact elongated stream of catalyst which is of such length and restricted cross-sectional area as to prevent substantial leakage of gaseous hydrocarbons therethrough without the use of a vapor-sealing catalyst valve.

2. A continuous catalytic apparatus for converting hydrocarbons in gaseous form in the presence of solid catalyst particles which comprises a conversion chamber adapted to hold a substantially compact column of catalyst particles and having baffling structure disposed therein which is constructed so as to assist flow of gases upwardly through such a column of catalyst, said chamber also being provided at one end with a hydrocarbon charge stock inlet and at the opposite end with a converted product outlet and also with an inlet for catalyst in solid particle form at its upper end and an outlet for such catalyst at its lower end, said charge stock inlet and outlet being in free vapor communication with said baffling structure, a catalyst feed leg of less cross section than said chamber extending above said chamber and connected to said catalyst inlet for delivery of catalyst thereto by gravity, said catalyst feed leg being of sufficient height that a greater head of catalyst may be created therein than the operating pressure in said chamber, a catalyst withdrawal leg connected to said catalyst outlet and extending below said chamber for withdrawal of spent catalyst by gravity, said catalyst withdrawal leg being of less cross section than said chamber and terminating in the lower end of a spent catalyst elevator, flow throttling means associated with the lower section of said catalyst withdrawal leg, a catalyst regeneration chamber provided at its lower end with an air inlet and with a regenerated catalyst outlet and also provided at its upper end with a flue gas outlet and with a spent catalyst inlet, means to pass spent catalyst from the upper portion of said spent catalyst elevator to said spent catalyst inlet in said regeneration chamber, means to pass regenerated catalyst from said regenerated catalyst outlet to the lower portion of a regenerated catalyst elevator, and means to pass regenerated catalyst from the upper portion of said regenerated catalyst elevator to said catalyst feed leg of said conversion chamber.

3. The apparatus of claim 2, characterized by means for introducing an inert purge gas to the lower portion of said spent catalyst elevator and means for venting such gas from the upper portion thereof.

4. In a cyclic, unitary process for the conversion of hydrocarbons in contact with a particle-form solid contact mass material wherein the contact mass particles are passed downwardly through a reaction zone in which they are contacted with hydrocarbons under reaction conditions of temperature and pressure and after removal from the reaction zone the contact mass particles are regenerated while passing downwardly through a regeneration zone and are then returned to the reaction zone, that improvement which permits transfer of contact mass from regenerator to reactor and from reactor to regenerator while preventing substantial escape of reactant gas from either zone through contact mass inlet and outlet means without resorting to the use of vapor sealing valves which comprises the following steps: removing the contact mass from the bottom of the reactor in an elongated throttled stream of such length and such limited cross-sectional area relative to the cross-sectional area of said reactor as to prevent escape through said stream of an appreciable proportion of the gaseous material charged to said reactor, and introducing the contact mass into each of the reactor zone and the regenerator zone through a compact elongated stream of contact mass extending upwardly above the zone fed to an elevation sufficient to provide a head in the contact mass stream great enough to force it into the zone fed, the length of each of said streams being such and the cross-sectional area thereof being so limited with respect to the cross-sectional area of the zone fed as to prevent escape from the zone fed through said stream of an appreciable proportion of the gaseous material charged to said zone.

5. That method of introducing particle-form solid contact mass material into a reactor through which it is continuously passed and utilized in the treatment of hydrocarbons at a pressure above atmospheric while substantially preventing the ingress of air to the reactor with the contact mass and the egress of hydrocarbons from the reactor through contact mass feeding channels, all without the use of vapor-sealing valves or similar mechanical means of reactor isolation which comprises: feeding contact mass material into the reactor through a flowing stream extending upwardly from the contact mass within the reactor to a supply body located above said reactor and open to atmospheric pressure, said supply body being sufficiently elevated to provide a pressure sufficient at the bottom of said stream to force contact mass into the reactor against the pressure existing therein, subjecting said stream at a level between its ends and near its lower end to a substantially inert gaseous atmosphere at a pressure above the hydrocarbon pressure within the upper section of said reactor so as to substantially exclude hydrocarbon vapor from said stream.

6. That method of removing particle-form contact mass material from a reactor through which it is continuously passed and utilized in the treatment of hydrocarbons at a pressure above atmospheric while substantially preventing egress of hydrocarbons from the reactor with removed contact mass, all without the use of vapor-sealing valves or similar mechanical means of reactor isolation which comprises: flowing contact mass material from the reactor to a zone under a substantially lower pressure than said reactor through an elongated confined stream of such length and such restricted cross-sectional area relative to the cross-sectional area of said reactor as to provide a resistance to volumetric gas flow much greater than the resistance to volumetric gas flow through said reactor and exposing said contact material flowing from said reactor at a location near the upper end of said confined stream to an atmosphere of substantially inert gas at a pressure above the hydrocarbon pressure within the lower section of said reactor.

7. A reactor wherein a moving column of particle-form solid contact mass material is contacted with hydrocarbons at pressures above atmospheric, feed means at the top to introduce contact mass thereinto against the pressure existing therein, means to introduce hydrocarbon reactant materials into said reactor and means to remove reaction product therefrom, the said hydrocarbon inlet and outlet means being spaced apart a distance less than the length of the reactor to have a bottom portion thereof unused in reaction, means to introduce an inert gas into this bottom portion, and means to maintain the pressure of inert gas so introduced at least equal to the pressure of hydrocarbons in adjacent portions of the reactor to prevent egress of hydrocarbons from the reactor together with contact mass, an elongated, downwardly extending drain conduit connected to the lower end of said reactor for withdrawal of said contact mass from the bottom portion of said reactor, said drain conduit having a diameter amounting to only a minor fraction of the diameter of said reactor, and flow throttling means associated with said drain conduit at a point which is a substantial distance below its connection to said reactor.

8. In a system for the conversion of hydrocarbons in the presence of a particle-form solid contact mass material, a reactor through which the contact mass material may pass as a moving column, means to admit hydrocarbons to said reactor and means to remove hydrocarbon reaction products therefrom, contact mass outlet means at the bottom of said reactor and contact mass feed means at the top thereof, the said feed means including a closed hopper in continuous communication with the reactor through at least one relatively short open feed tube, means to supply an inert gas to said hopper, means to maintain said gas therein at a pressure above the pressure in the reactor, and means to feed contact mass material into said hopper against the pressure existing therein.

9. In a process of continuously catalytically converting hydrocarbons in the presence of particle-form solid catalyst material wherein the catalyst is moved downwardly through a conversion zone operating under pressure as a substantially compact column of particles and hydrocarbons in a gaseous form are passed under conversion conditions through said column of catalyst and wherein active catalyst particles are introduced to said zone near the top thereof and spent particles are withdrawn near the bottom thereof so as to maintain a column of active catalyst while preventing the escape of a substantial amount of gaseous hydrocarbons through the catalyst-introducing and catalyst-withdrawing systems, the improvement which comprises introducing the active catalyst particles into said conversion zone through a substantially compact continuous stream of catalyst extending between said zone and a compact body of catalyst maintained above said zone, said body being maintained at a pressure substantially below that in said zone and said stream being of such length as to provide a greater head of catalyst at its lower end than the pressure differential between said body and said zone, and said stream being further of such length and cross-sectional area as to provide a resistance to volumetric gas flow substantially greater than that through said zone, and withdrawing spent catalyst from said column of catalyst in the form of an elongated, throttle stream of catalyst of such length and limited cross-sectional area relative to the cross-sectional area of said zone as to provide substantially greater resistance to volumetric flow of gas therethrough, than the resistance to volumetric gas flow through said column of catalyst within said zone.

10. In a process of continuously catalytically converting petroleum hydrocarbons in the presence of solid catalyst particles having a size between about 5 and about 100 mesh wherein the catalyst is moved downwardly through a conversion zone operating under pressure as a substantially compact column of particles and hydrocarbons in gaseous form are passed under conversion conditions through said column of catalyst and wherein active catalyst particles are introduced to said zone near the top thereof and spent particles are withdrawn near the bottom thereof so as to maintain a column of active catalyst while preventing the escape of a substantial amount of gaseous hydrocarbons through the catalyst-introducing and catalyst-withdrawing systems, the improvement which comprises establishing a compact, upwardly-extending stream of catalyst particles above said column of catalyst which forms a continuous body of catalyst with said column, said stream being of such height and restricted cross-sectional area relative to the cross-sectional area of said column as to provide a substantially greater resistance to volumetric flow of gas therethrough than through said column of catalyst and as to provide a head of catalyst greater than the pressure in said conversion zone so that catalyst feeds by gravity from the catalyst stream to said column of catalyst without passing through any vapor-sealing catalyst valve, and withdrawing spent catalyst from said column of catalyst in the form of a throttled, downwardly-extending, elongated stream of catalyst of such length and restricted cross-sectional area relative to the cross-sectional area of said column as to prevent substantial leakage of gaseous hydrocarbons therethrough without the use of a vapor-sealing catalyst valve.

11. A process according to claim 1 further characterized by the step of maintaining adjacent the lower end of said catalyst feed stream a blanket of inert gas having a pressure above the pressure in said conversion zone but below said catalyst head pressure so as to exclude hydrocarbon vapors from said catalyst feed stream.

12. In a process of continuously catalytically converting hydrocarbons in the presence of solid catalyst particles wherein the catalyst is moved downwardly through a confined zone operating under pressure as a substantially compact column of particles and hydrocarbons in a gaseous form are passed under conversion conditions through a major length of said column and wherein active catalyst particles are introduced to said zone near the top thereof and spent particles are withdrawn near the bottom thereof so as to maintain a column of active catalyst while preventing the escape of a substantial amount of gaseous hydrocarbons through the catalyst-introducing and catalyst-withdrawing systems, the improvement which comprises: introducing the active catalyst particles into said zone as at least one substantially compact, elongated stream of catalyst extending upwardly from said column of catalyst within said zone, said elongated stream being of such height and such limited cross-sectional area relative to the cross-sectional area of said zone as to provide a head of catalyst greater than the gaseous pressure within the upper section of said zone while preventing substantial escape of gas from said zone upwardly through said stream, purging the spent catalyst in the lower section of said zone with an inert purge gas and withdrawing the purge gas from said column within said zone below that portion of its length devoted to hydrocarbon flow, and withdrawing spent catalyst from said zone as a throttled, elongated, downwardly-extending stream which is of such length and limited cross-sectional area relative to the cross-sectional area of said zone as to provide substantially more resistance to volumetric gas flow therethrough than said column of catalyst within said confined zone.

13. In a process of continuously catalytically cracking heavier petroleum hydrocarbons to gasoline in the presence of particle-form solid catalyst material wherein the catalyst is moved downwardly through a conversion zone as a substantially compact column of particles and vapors of the heavier hydrocarbons are passed under cracking conditions through said column of catalyst and wherein active catalyst particles are introduced into said zone near the top thereof in order to maintain said column of catalyst, the improvement which comprises maintaining a compact body of catalyst at an elevation above said conversion zone and a confined stream of catalyst between said body and said zone, the vertical distance between said zone and said body being sufficient to insure the flow of catalyst downwardly in said confined stream and into said conversion zone while offering substantial resistance to gas flow upwardly through the catalyst in said confined stream, and maintaining adjacent the lower end of said confined stream a blanket of substantially inert gas at a pressure above the pressure within said zone so as to seal said stream from the hydrocarbon gases within said zone.

14. A method according to claim 4 characterized by the further steps of exposing said inlet stream of contact mass to said reactor at a location near the lower end of said inlet stream to an atmosphere of inert gas at a pressure above the gaseous pressure within the upper section of said reaction zone and below that which would interfere with the downward flow of catalyst in said inlet stream so as to prevent substantial presence of gasiform reactants in said inlet stream and exposing said outlet stream of contact mass leading from said reactor at a location near the upper end of said outlet stream to an atmosphere of inert gas at a pressure above the gaseous pressure within the lower section of said reaction zone so as to prevent substantial presence of gasiform reactants within said outlet stream.

15. A process of continuously catalytically converting hydrocarbons in the presence of a particle-form solid catalyst which comprises: maintaining a substantially compact vertical, confined column of downwardly moving particle form catalyst, continuously replenishing said column at its upper end, passing hydrocarbon vapors under reaction conditions through a major portion of said column length to effect the conversion thereof, introducing an inert seal gas into the lower section of said column below that portion devoted to hydrocarbon passage, the pressure of said inert gas being maintained above that in the portion of the column nearest thereabove which is devoted to hydrocarbon passage, withdrawing catalyst from the lower end of said column in a continuous, elongated, downwardly-extending stream and throttling the flow of said stream, the cross-sectional area of said stream being only a small fraction of that of said column and its length between the point of throttling and the bottom of said column being such as to provide substantially greater resistance to volumetric gas flow than the resistance to volumetric gas flow through said column.

16. A process for continuous catalytic conversion of hydrocarbons, the improvement comprising: maintaining a substantially compact, confined column of downwardly-moving solid catalyst particles, passing hydrocarbon vapors under reaction conditions through said column throughout a major portion of its length, maintaining a confined bed of said catalyst above said column in free catalyst communication with said column through at least one confined passageway extending downwardly from said bed to said column, introducing inert seal gas over said confined bed at a rate sufficient to maintain a seal gas pressure above that in the upper section of said column so as to substantially prevent hydrocarbon flow from said column into said bed, introducing active catalyst particles onto said bed from a substantially compact, vertical, confined stream of catalyst extending upwardly from said bed to a supply accumulation thereabove maintained at a gaseous pressure substantially below that in said bed, said confined stream being of such length as to provide a head of catalyst at its lower end greater than the differential in gaseous pressure between said supply accumulation and said bed, and said stream having a cross-sectional area substantially less than that of said column, introducing an inert seal gas into the lower section of said column below that portion devoted to hydrocarbon passage, the pressure of inert gas being maintained above that in the portion of said column nearest thereabove which is devoted to hydrocarbon passage, withdrawing catalyst from the lower end of said column as a continuous, confined downwardly-extending stream, throttling the flow of said stream, so as to provide continuity of catalyst movement as a compact mass from the level of throttling upwardly to said catalyst supply source.

17. In a system for the conversion of hydrocarbons in the presence of a particle-form solid contact mass material, a reactor through which the contact mass material may pass as a moving column, means to admit hydrocarbons to said reactor and means to remove hydrocarbon reaction products therefrom, contact mass outlet means at the bottom of said reactor, a partition across the upper section of said reactor providing a seal chamber in the upper end thereof, at least one conduit extending downwardly a short distance into said reactor from said partition for flow of contact mass from said seal chamber to the portion of the reactor therebelow, means to introduce an inert gas into said seal chamber, and means to maintain the pressure of said inert gas in said seal chamber above that in the reactor therebelow, a supply hopper located above said reactor and a substantially vertical feed conduit between said hopper and the upper end of said reactor for flow of contact mass into said seal chamber, said supply hopper being located sufficiently above said reactor to provide a vertical length of said feed conduit which corresponds to a head of said contact mass material greater than the gaseous pressure in said seal chamber.

18. An apparatus for conducting conversion of hydrocarbons under pressure in the presence of a particle-form solid catalyst comprising: an elongated upright vessel closed on either end, a partition across said vessel within the upper section thereof defining a seal chamber within the upper end of said vessel, at least one short tube depending from said partition for flow of catalyst from said seal chamber to the portion of said vessel therebelow, means to introduce seal gas into said seal chamber, means to control the seal gas pressure in said seal chamber above that in said vessel therebelow, a supply hopper located above said vessel, a substantially vertical catalyst feed conduit extending between said hopper and said seal chamber for flow of catalyst into said seal chamber, said feed conduit being of a length corresponding to the length of a column of said catalyst providing a head of catalyst greater than the gaseous pressure maintained in said seal chamber, an elongated, downwardly-extending outlet conduit for flow of catalyst from the lower end of said vessel, said drain conduit being of a cross-section area substantially less than that of said vessel, flow throttling means on said drain conduit, an inlet for hydrocarbons to said vessel and an outlet for conversion products therefrom.

THOMAS P. SIMPSON.
JOHN W. PAYNE.
JOHN A. CROWLEY, Jr.